March 16, 1965 E. C. MERSEREAU 3,173,305
HAND BRAKE MECHANISM
Filed Oct. 5, 1962 2 Sheets-Sheet 1
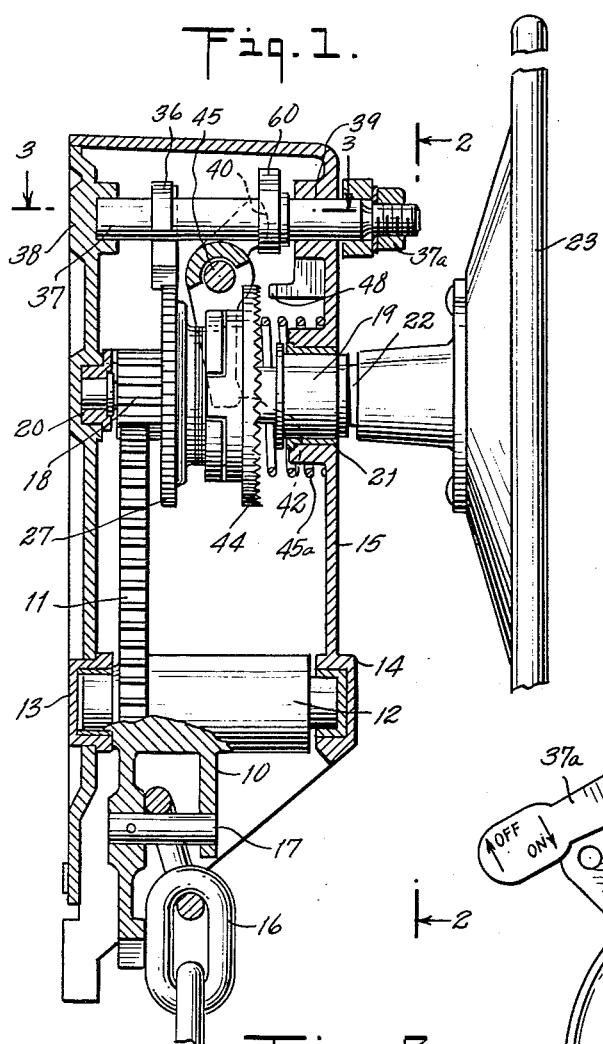
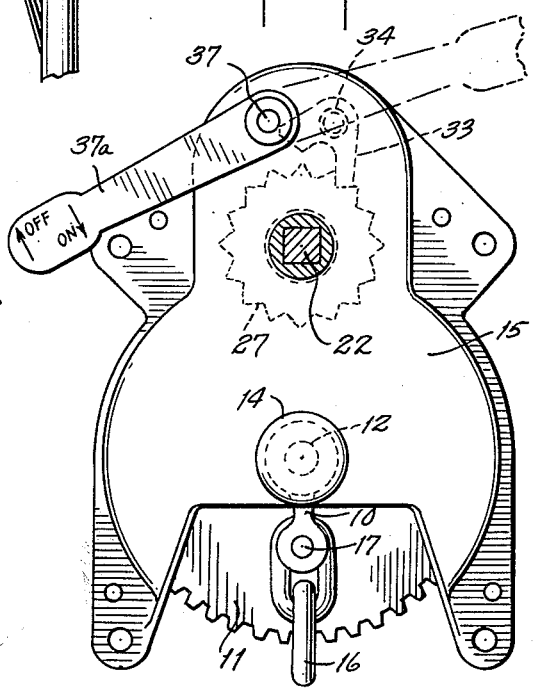
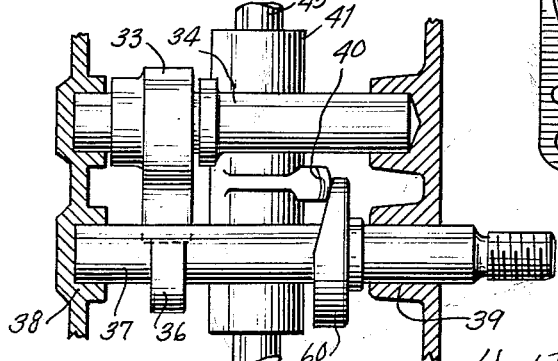
INVENTOR.
EVERARD C. MERSEREAU
BY
Ward, Neal, Haselton, Orme & McElhannon
ATTORNEYS March 16, 1965  E. C. MERSEREAU  3,173,305
HAND BRAKE MECHANISM
Filed Oct. 5, 1962  2 Sheets-Sheet 2
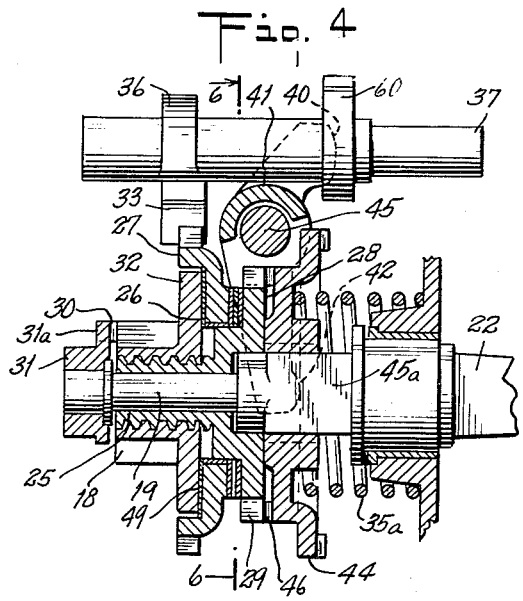
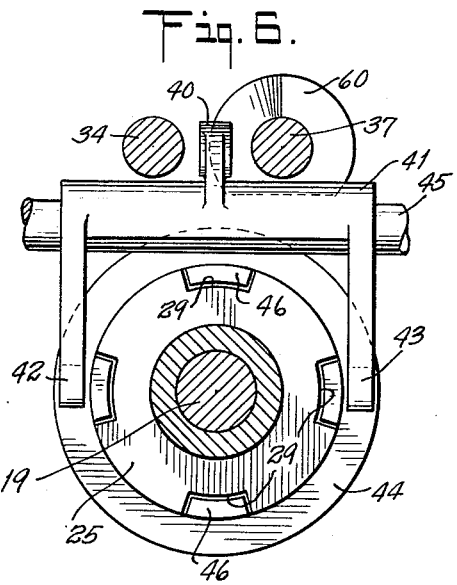
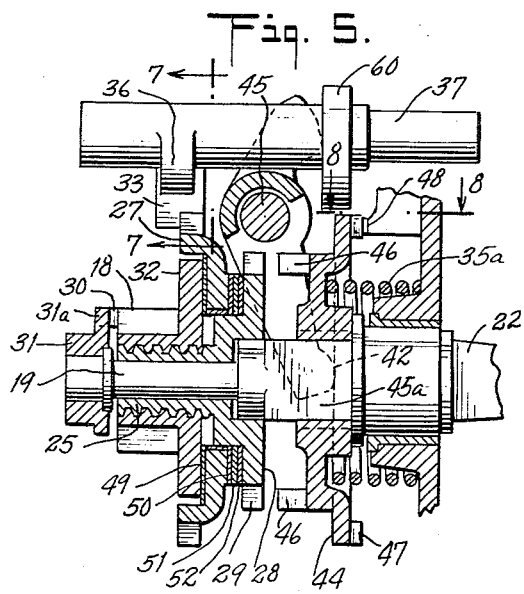
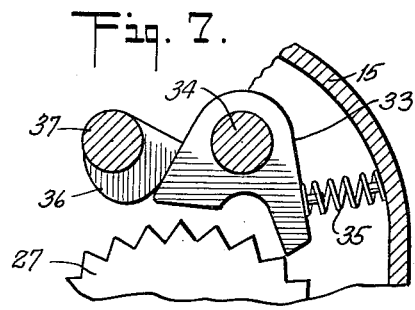
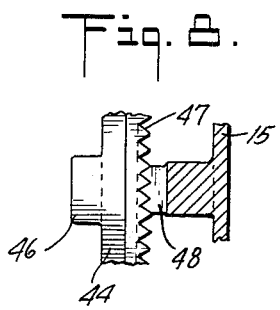
INVENTOR.
EVERARD C. MERSEREAU
BY
Ward, Neal, Haselton, Orme + McElhannon
ATTORNEYS

United States Patent Office 3,173,305
Patented Mar. 16, 1965

3,173,305
HAND BRAKE MECHANISM
Everard C. Mersereau, Westfield, N.J., assignor to Ellcon-National, Inc., New York, N.Y., a corporation of New York
Filed Oct. 5, 1962, Ser. No. 228,578
7 Claims. (Cl. 74—505)

This invention relates to brake mechanisms and more particularly to hand brake mechanisms for railway cars employing both a friction clutch and a breakaway clutch.

Heretofore, railway car hand brakes have been made in two general categories both of which are activated by rotation of a large rotatable hand wheel which acts through a suitable gear train to engage or release the brakes. The force produced by turning the hand wheel to engage the brakes is held by pawl and detent means.

Hand brakes in the first category were so designed that by manipulating a trip lever, the pawl is raised from engagement with the detent wheel thus releasing the force and permitting the gear train to revolve freely in the opposite direction to release the brake. With hand brakes in this category, the hand wheel spins violently in a counterclockwise direction during release of the brakes, thus endangering the operator if he did not get his hands from the wheel in time, or if he caught his clothes in the wheel.

Hand brakes in the second or friction clutch category have generally the same construction as above but instead of using a trip lever to quickly disengage the braking member from the brake winding member, a friction clutch is employed whereby the operator by turning the handwheel can effect a gradual disengagement of the braking member from the brake winding member. An example of the friction clutch type of handbrake is set forth in my Patent No. 2,618,169, but to fully release the brakes, it is necessary to move the handwheel a substantial amount clockwise, e.g. several turns, which is both effort and time consuming. However, mechanisms of this type have been found to be durable and reliable.

In my copending application Serial No. 219,834, filed August 28, 1962, I have disclosed one form of hand brake mechanism which combines the desirable features of the two categories of brake mechanisms described above, namely, the ability to release the brakes either gradually or quickly without spinning of the hand wheel. Hand brakes mechanisms combining these features are also shown in Patents Nos. 2,848,083 and 3,040,597. However, in each of the mechanisms disclosed in said application and said patents there is a substantial departure in the construction of parts and the arrangements thereof from that shown in my Patent No. 2,168,169 and, therefore, such constructions represent departures from a construction which has been found to be durable and reliable. In addition, in the construction shown in Patent No. 3,040,597 a substantial number of expensive parts are required. In the construction of Patent No. 2,848,083 a relatively large number of complex parts are required and the contact faces of the detent wheel, as well as the faces of the parts which it contacts, are conical which are difficult to machine and are relatively inefficient in transmitting the force necessary to produce the required frictional engagement between the surfaces.

One object of the invention is to provide a brake mechanism which may be employed either to gradually release the brake or to release the brakes quickly and which employs constructional features which have been proven to be practical.

Another object of my invention is to provide such a hand brake mechanism which has a small number of parts which are simple and inexpensive to manufacture.

Other objects and advantages of the invention will be apparent from the following detailed description of my presently preferred embodiment thereof, which description should be considered in conjunction with the accompanying drawings in which:

FIG. 1 is a side elevation view, partly in section, of a brake mechanism incorporating the invention;

FIG. 2 is a front view, partly in section, of the brake mechanism of FIG. 1, and is taken along the line 2—2 shown in FIG. 1;

FIG. 3 is a fragmentary, plan view, partly in section, of part of the mechanism shown in FIGS. 1 and 2 and is taken along the line 3—3 shown in FIG. 1;

FIG. 4 is a fragmentary, sectional side elevation view showing certain components of the brake mechanism of FIG. 1 in the positions assumed during application of the brakes of the vehicle on which the mechanism is mounted;

FIG. 5 is a view similar to FIG. 4 showing the positions assumed by the several components of the brake mechanism when in the quick release position;

FIG. 6 is a fragmentary partially sectioned, rear elevation of the brake mechanism taken along the lines 6—6 of FIG. 4;

FIG. 7 is a fragmentary, front elevation view partly in section, (and taken along lines 7—7 of FIG. 5,) of the pawl and cam arrangement in the release position; and FIG. 8 is a fragmentary, plan view, partly in section, taken along lines 8—8 of FIG. 5 showing the relationship between the slidable clutch member and the housing.

Referring to FIG. 1, this and the other figures being illustrative of a preferred embodiment of my invention, the brake operating mechanism comprises a drum 10 rotatable by a main gear 11 which may be rigidly connected to the drum 10. The drum 10 and gear 11 are mounted on a shaft 12 which may be journalled at its ends in bearings 13 and 14 mounted on the housing 15. The drum 10 operates the brake rigging on the vehicle on which it is mounted and may be connected therewith by a chain 16 which is fastened to the drum 10 by a pin 17.

The main gear 11 is rotatable by pinion or driving gear 18 which is mounted on shaft 19 and freely rotatable thereabout. Shaft 19 is supported by bearings 20 and 21 mounted on housing 15. The shaft 19 may have a tapered portion 22 (FIG. 4) which carries a manually operated member such as hand wheel 23 for manually rotating shaft 19.

Referring to FIGS. 4 and 5 in which the side of the housing adjacent the handwheel 23 is referred to as the front and the opposite side of the housing, the back; a flanged collar 25 is mounted on an intermediate portion of a manually rotatable shaft and is freely rotatable thereon. The back portion, or hub, of the rotatable collar 25 is threaded for engagement with the co-axially mounted driving pinion 18 which, in turn, is engageable with the gear wheel 11. The front portion of the collar 25 is of stepped construction, one face portion 26 extending generally parallel to the axis of the shaft 19, providing a support for a detent wheel 27 mounted co-axially of the shaft 19. The forward face 28 of the collar is fitted with peripherally spaced apertures 29 for reasons to be explained hereinafter.

The back face of the pinion 18 is fitted with a stop engaging portion 30 to prevent it from jamming into a stop member 31, mounted on one end of the shaft 19 and rotatable therewith. The member 31 has a stop engaging portion 31a. The stop engaging parts used in this particular embodiment of my invention are similar, in construction and operation to the parts defined and explained in my Patent No. 2,618,169. The front face of the pinion has a flange 32 which extends substantially perpendicular to the axis of the shaft 19.

Mounted on the shaft 19 in adjacent relationship to the pinion 18 is a detent wheel 27 which has a portion of its back face lying in a plane substantially parallel to the face of the flange 32 of the pinion 18. The detent wheel 27 cooperates with a pawl 33, pivotally supported on a shaft 34 mounted in the housing 15 so that the axis of the shaft lies generally parallel to and above the axis of the shaft 19. The pawl 33 is normally urged into engagement with the teeth on the periphery of the detent wheel by a spring 35 (FIG. 7). Co-operating with the pawl 33 is a first cam member 36 mounted on a shaft 37 supported in the journals 38 and 39 of the housing 15. A trip lever 37a is mounted on the end of the shaft 37 adjacent the hand wheel 23 and is held thereon, such as by a key, so that the shaft 37 is rotatable by a movement of the lever 37a to the "off" and "on" positions as illustrated in FIG. 2. A second cam member 60 spaced from the first cam member 36 along the axis of the supporting shaft 37 in a direction towards the front of the housing, cooperates with a cam follower 40 rigidly connected to a bell crank 41 fitted with downwardly extending fingers 42 and 43 which are engageable with the periphery of the back face of a clutch member 44; the bell crank 41 being pivotably supported on the shaft 45 mounted in the housing 15. The clutch member 44 is slidably mounted adjacent to the collar 25 on a non-circular portion 45a of the shaft 19, which may be square in cross-section, so that the clutch member 44 rotates with the shaft 19.

The clutch member 44 has a plurality of axially extending projections 46 spaced around the periphery of its back face. The front face of the clutch member 44 is fitted with saw-toothed indentations 47 (FIG. 8) which are engageable with projections 48 fixed to the housing 15 and extending in an axial direction towards the front part of the clutch member 44.

The clutch member 44 is normally biased into immediately adjacent relation with the collar 25 by a spring member 35a which bears against the front face of the clutch member 44 and a portion of the brake housing 15.

A plurality of clutch discs 49, 50, 51 and 52 are mounted co-axially about the freely rotatable collar 25, disc 49 being between the flange 32 of the pinion 18, and the back face of the detent or ratchet wheel 27; whereas clutch discs 50–52 are mounted in immediately adjacent relationship between the front face of the detent wheel 27 and a back face of the flange 28 of the collar 25. When sufficient external force is applied to the clutch discs, the friction between the discs, pinion 18, detent wheel 27 and collar 25 causes them to rotate as a unit with the shaft 19.

The operation of the brake mechanism embodying this invention as illustrated in the drawings will now be explained in detail. Assuming that the brakes on the vehicle to which the braking mechanism is attached are released and that the shaft supporting the first and second cam means is in a position such that the pawl 33 is in cooperative engagement with the detent wheel 27 and the finger members 42 and 43 are not exerting any substantial force on the clutch member, the clutch member 44 will be immediately adjacent the rotatable collar 25 so that the axially extending projections 46 on the clutch member are protruding through the peripherally spaced apertures 29 on the collar thus preventing free rotation of the collar. To apply the brakes, all that is necessary, is to turn the hand wheel 23 in a clockwise direction as viewed from the right of FIG. 1. Turning the hand wheel clockwise initially has the effect of rotating the clutch member 44 and the collar 25 with respect to the pinion 18. The pinion because of its threadable engagement with the collar 25, and the external forces acting on the pinion through the gear 11 is caused to move to the right, as the brake mechanism is viewed with respect to FIG. 4. Continued clockwise rotation of the shaft 19 causes the pinion 18 to move to the right to such an extent that it clamps the detent wheel 27 between the pinion 18 and the collar 25 causing these parts to rotate as a unit with the shaft 19. The hand wheel is then rotated until the brakes are applied properly. Throughout the rotation of the hand wheel 23, the pawl 33 rides over the teeth of the detent wheel 27 so that it does not prevent clockwise rotation of the unit and the shaft but counterclockwise rotation of the wheel 27 is prevented by engagement of the pawl 33 with the teeth of the wheel 27.

When it becomes necessary to release the brakes either a quick release or a gradual release can be used depending on the circumstances. If a gradual release is desired, all that is necessary is to turn the hand wheel 23 in a counterclockwise direction. Counterclockwise rotation of the hand wheel 23 has the effect of moving the pinion 18 slightly to the left, reducing the friction between the pinion 18 and the detent wheel 27, again because of its threaded engagement with the collar 25, and permitting the pinion 18 to rotate counterclockwise with respect to the wheel 27 until the friction between the disc 49 and the pinion 18 and the wheel 27 increases sufficiently to again stop the pinion 18. Such counterclockwise rotation of the pinion 18 is caused by the force of the brake rigging acting through the main gear 11 so that the brakes are partly released. To completely release the brakes it is necessary to rotate the wheel in a counterclockwise direction substantially the same number of times that the wheel 23 was rotated in the clockwise direction.

If the operator, on the other hand, desires a quick release of the brake mechanism, he merely pushes the trip handle 37a to the "released" or "off" position thereby rotating the shaft 37 supporting the axially spaced first and second cams 36 and 60. The cam 60 nearest to the handle or front part of the housing, making contact with the camming follower 40 rigidly mounted to the bell crank, begins to force the follower 40 of the bell crank toward the back part of the housing thus causing the downwardly extending fingers 42 and 43 to exert an axially directed force on the clutch member 44, thus sliding clutch member 44 and the axially extending projections to the right and out of the apertures 29 on flange 28 of the collar 25.

At this point, release of the brakes is prevented by the engagement of the pawl 33 with the teeth of the detent wheel 27. The surface of the cam 36 is designed so that after separation of the clutch member 44 and the collar 25, the cam 36 disengages the pawl 33 from the teeth of the detent wheel 27. In this way spinning of the hand wheel 23 is prevented. With the clutch member 44 separated from the collar 25, and with the pawl 33 disengaged from the detent wheel 27, the pinion 18, the detent wheel 27, and the collar 25 are free to rotate about the shaft 19 as a unit and will do so because of the strong external forces exerted on the pinion 18 by the main gear 11, tending to turn the pinion 18 in a brake releasing direction.

While the collar 25 is rotating about the shaft 19, the friction between the collar 25 and the shaft 19 may be sufficient, in some cases, to tend to cause the shaft 19 and the hand wheel 23 to rotate. If desired, such rotation may be eliminated by the engagement of the teeth 47 mounted on the forward face of the clutch member 44 with the axially extending projections 48 mounted on the frame housing when the clutch member 44 is in the disengaged position.

It will be apparent that the combination of both brake release mechanisms permits the achievement of the highly desirable and improved results which cannot be obtained with either mechanism alone. It will be seen that without the clutch mechanism, it would not be possible to release the brakes gradually, smoothly, and in small increments, and completely and instantaneously without moving the hand wheel. On the other hand, without the quick release mechanism, while it would be possible to adjust the brakes to any desired position, it would not be possible to disengage them quickly and to eliminate the time and effort required for several turns of the hand wheel 23. Furthermore, the combination set forth requires fewer parts than the parts required for two separate mechanisms connected to the same chain 16, and the fewer parts of the combination cooperate to produce the results of two separate mechanisms.

Having thus described my invention with particular reference to the preferred form thereof and having described certain modifications, it will be obvious to those skilled in the art to which the invention pertains after understanding my invention that various changes and other modifications may be made therein without departing from the spirit and scope thereof as defined by the claims appended hereto.

I claim:
1. In a hand brake mechanism, the combination with a rotary chain winding drum and a main gear wheel of: a rotatable shaft, first clutch means comprising a collar mounted on said shaft, said collar having a flange extending radially therefrom, said collar being freely rotatable about said shaft, and having an axially extending threaded hub, an internally threaded driving member co-axially mounted on said threaded hub and engageable with said gear wheel, said driving member being axially moveable relative to said collar, and a detent means co-axially mounted on said hub intermediate said driving member and said flange, said detent means being clamped between said driving member and said flange upon relative rotation of said collar and said driving member in a predetermined direction, means co-operating with said detent means for preventing reverse rotation thereof; and a second clutch means co-axially mounted on said rotatable shaft and rotatable therewith and slidable thereon, said clutch means being engageable with said collar for preventing free rotation of said collar about said shaft, said first and second clutch means allowing the brake mechanism to be released either quickly or gradually.

2. In a hand brake mechanism, the combination with a rotary chain winding drum and a main gear wheel of: a manually rotatable driving shaft, a collar co-axially mounted on said shaft and freely rotatable thereabout, said collar having an integrally formed flange at one end thereof extending substantially perpendicular to said rotatable shaft, a driving pinion coaxially and threadably fitted on said collar, said driving pinion being engageable with said main gear wheel, a detent wheel mounted coaxially on said collar intermediate said driving pinion and flange, a plurality of clutch disks mounted coaxially around said shaft adjacent said driving pinion and flange for connecting said detent wheel to said flange and driving pinion whereby said pinion, detent wheel and collar can rotate freely about said shaft as a unit, a pawl means engageable with said detent wheel for preventing said unit from rotating freely about said shaft, and a spring biased clutch means slidably and coaxially mounted on and rotatable with said shaft, one of said flange and said clutch means being fitted with axially extending projections spaced about its periphery and the other of said flange and said clutch means being provided with peripherally spaced apertures for receiving said projections, whereby the brake mechanism may be released either gradually by rotation of said shaft or completely by disengaging said clutch means from said flange.

3. In a hand brake mechanism, the combination with a rotary chain winding drum and a main gear wheel of: a manually rotatable driving shaft, a collar co-axially mounted on said shaft and freely rotatable thereabout, said collar having an integrally formed flange at one end thereof extending substantially perpendicular to said rotatable shaft, said flange having axially extending apertures spaced peripherally thereon, a driving pinion co-axially and threadably fitted on said collar and engageable with said gear wheel, said pinion being capable of axial movement with respect to said shaft upon rotation of driving shaft, a detent wheel co-axially mounted on said collar intermediate said driving pinion and said flange, a plurality of clutch discs mounted co-axially around said shaft adjacent said driving pinion and flange for connecting said detent wheel to said flange and driving pinion whereby said pinion, detent wheel and collar can rotate freely about said shaft as a unit, pawl means engageable with said detent wheel for preventing said unit from rotating freely about said shaft, a spring biased clutch member slidably and co-axially mounted on said shaft, and rotatable therewith said clutch member being fitted with axially extending projectons spaced about its periphery for slidable engagement with said flange in said apertures, and manually controllable means mounted adjacent said clutch member and engageable therewith for axially sliding said clutch member into and out of engagement with said flange and for engaging and disengaging said pawl with said detent wheel.

4. In a brake mechanism according to claim 3 wherein said pinion has a stop engaging portion spaced radially from and extending in the direction of the axis of said pinion, and further comprising, a stop member mounted on said shaft and rotatable therewith, said stop member being engageable with said stop engaging portion in a direction transverse to the axis of said pinion.

5. In a brake mechanism according to claim 3 wherein said manually controllable means comprises sliding means engageable with said clutch member, a rotatable shaft, a trip handle operatively connected to said shaft, a first and second cam means mounted on shaft in spaced relationship, said first cam means engaging said pawl and said second cam means engaging said sliding means.

6. In a brake mechanism according to claim 3, further comprising stop means engageable with said clutch member in the position thereof in which it is disengaged from said flange for preventing rotation of said clutch member.

7. In a hand brake mechanism the combination with a chain take up drive gear of a rotatable hand wheel shaft, a collar freely rotatably mounted on said shaft, said collar having a flange extending radially therefrom and an axially extending threaded portion, a driving gear mounted on said collar in threadable engagement therewith, a detent wheel coaxially mounted on said collar intermediate said driving gear and said flange, means co-operating with said detent wheel for preventing reverse rotation thereof, and means for transmitting rotative movement of said hand wheel to said collar whereby said driving gear is caused to move relatively with respect to said collar thereby clamping said detent wheel between said flange and driving gear.

References Cited by the Examiner
UNITED STATES PATENTS

| 2,282,736 | 5/42 | Mersereau | 74—505 |
| 2,668,457 | 2/54 | Bretz | 74—505 |
| 3,040,597 | 6/62 | Bretz | 74—505 |

BROUGHTON G. DURHAM, *Primary Examiner.*